United States Patent
Wittebrood et al.

(10) Patent No.: US 6,596,413 B2
(45) Date of Patent: Jul. 22, 2003

(54) BRAZING PRODUCT HAVING A LOW MELTING POINT

(75) Inventors: Adrianus Jacobus Wittebrood, Velserbroek (NL); Jacques Hubert Olga Joseph Wijenberg, Amsterdam (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 36 days.

(21) Appl. No.: 09/984,968

(22) Filed: Oct. 31, 2001

(65) Prior Publication Data

US 2002/0088717 A1 Jul. 11, 2002

Related U.S. Application Data

(60) Provisional application No. 60/304,447, filed on Jul. 12, 2001.

(30) Foreign Application Priority Data

| Nov. 8, 2000 | (NL) | ................................ 1016564 |
| Jul. 3, 2001 | (EP) | ............................... 01202570 |

(51) Int. Cl.$^7$ ............................. B32B 15/20; B23K 1/00
(52) U.S. Cl. ................. 428/652; 148/518; 148/528; 148/535; 165/177; 165/905; 428/648; 428/654; 428/658; 428/668; 428/674; 428/675; 428/680; 428/926; 428/935; 428/936
(58) Field of Search .............................. 428/652, 648, 428/654, 658, 668, 674, 675, 680, 926, 935, 936; 148/518, 528, 535; 165/177, 905

(56) References Cited

U.S. PATENT DOCUMENTS

| 2,821,014 A | 1/1958 | Miller |
| 3,482,305 A | 12/1969 | Dockus et al. |

(List continued on next page.)

FOREIGN PATENT DOCUMENTS

| DE | 3821073 | 1/1989 |
| DE | 19531035 A1 | 2/1997 |
| DE | 19531035 C2 | 2/1997 |
| DE | 19938847 | 3/2001 |
| EP | 0227261 | 7/1987 |
| EP | 0587307 | 3/1994 |
| FR | 2354171 | 1/1978 |
| FR | 2617868 | 1/1989 |
| GB | 1176688 | 1/1970 |
| WO | 0071784 | 11/2000 |

OTHER PUBLICATIONS

Wernick and Pinner, "The Surface Treatment and Finishing of Aluminium and its Alloys", 5$^{th}$ Edition, vol. 1, pp. 181–182 and pp. 191–203(1987). (no month given).

(List continued on next page.)

Primary Examiner—Robert R. Koehler
(74) Attorney, Agent, or Firm—Stevens, Davis, Miller & Mosher, LLP

(57) ABSTRACT

Disclosed is an aluminium brazing product, such as a brazing sheet product, having a substrate (1) of an aluminium alloy comprising silicon in an amount in the of 2 to 18% by weight, and on at least one outer surface a layer (2) comprising nickel, wherein a separately deposited layer (3) is applied on one side of the layer (2) comprising nickel and the layer (3) comprising a metal such that taken together the aluminium base substrate (1) and all layers exterior thereto form a metal filler having a liquidus temperature in the range of 490 to 570° C., and preferably in the range of 510 to 550° C. The invention also relates to a method of manufacturing such a brazing product and to a brazed assembly comprising at least one component made of the brazing sheet product.

70 Claims, 1 Drawing Sheet

U.S. PATENT DOCUMENTS

| | | |
|---|---|---|
| 3,597,658 A | 8/1971 | Rivera |
| 3,963,454 A | 6/1976 | Singleton, Jr. |
| 3,970,237 A | 7/1976 | Dockus |
| 4,028,200 A | 6/1977 | Dockus |
| 4,157,154 A | 6/1979 | Scott et al. |
| 4,164,454 A | 8/1979 | Schober |
| 4,388,159 A | 6/1983 | Dockus et al. |
| 4,602,731 A | 7/1986 | Dockus |
| 4,721,653 A | 1/1988 | Oda et al. |
| 5,069,980 A | 12/1991 | Namba et al. |
| 5,422,191 A | 6/1995 | Childree |
| 5,466,360 A | 11/1995 | Ehrsam et al. |
| 5,601,695 A | 2/1997 | Muranushi |
| 6,129,262 A | 10/2000 | Cooper et al. |
| 6,379,818 B1 | 4/2002 | Mooij et al. |

OTHER PUBLICATIONS

Adrianus Jacobus Wittebrood, Jacques Hubert Olga Joseph Wijenberg, Joop Nicolaas Mooij, "Nickel–plated Aluminium Brazing Sheet", Research Disclosure, No. 439, pp. 1946–1947 (Nov. 2000).

US Patent Application Publication No. US 2002/0102431 published on Aug. 1, 2002 in the name of Adrianus Jacobus Wittebrood et al.

US Patent Application Publication No. US 2002/0086179 published on Jul. 4, 2002 in the name of Adrianus Jacobus Wittebrood.

US 6,596,413 B2

BRAZING PRODUCT HAVING A LOW MELTING POINT

This claims priority under 35 USC 119 (e) from U.S. provisional patent application No. 60/304,447, filed Jul. 12, 2001, incorporated herein by reference in its entirety.

FIELD OF THE INVENTION

The invention relates to an aluminium brazing product having a base substrate (1) of an aluminium alloy comprising silicon in an amount in the range of 2 to 18% by weight, and on at least one outer surface a layer (2) comprising nickel. Further, the invention relates to a brazing sheet product having a core sheet made of an aluminium alloy having on at least one surface of the core sheet clad an aluminium clad layer (1), the aluminium clad layer being made of an aluminium alloy comprising silicon in an amount in the range of 2 to 18% by weight, and a layer (2) comprising nickel on the outer surface of the aluminium clad layer. The invention also relates to a method of manufacturing such a brazing product and to a brazed assembly comprising at least one component made of the brazing sheet product.

DESCRIPTION OF THE RELATED ART

Brazing, by definition, employs filler metal having a liquidus above 450° C. and below the solidus of the base metal. Brazing is distinguished from soldering by the melting point of the filler metal: solders melt below 450° C.

Brazing sheet products finds wide applications in heat exchangers and other similar equipment. Conventional brazing sheet products having a core sheet, typically an aluminium alloy of the Aluminium Association (AA)3000-series, having on at least one surface of the cores sheet clad an aluminium clad layer, the aluminium clad layer being made of an AA4000-series alloy comprising silicon in an amount in the range of 2 to 18% by weight, and preferably in the range of 7 to 14% by weight. The aluminium clad layer may be coupled to the core alloy in various ways known in the art, for example by means of roll bonding, cladding spray-forming or semi-continuous or continuous casting processes. These aluminium clad layers have a melting point or liquidus temperature typically in the range of 577 to 600° C.

Ideally, the melting point of the aluminium alloy clad layer should be substantially lower than the melting point of the core alloy. Otherwise, the temperature control during subsequent brazing operations becomes very critical. Aluminium alloys having a lower melting point than the melting point of aluminium clad layer cannot be used for the aluminium core layer. Hence, the high melting point of the conventional aluminium clad alloys limits the choice for possibly cheaper and/or stronger aluminium core alloys.

However, there is a market demand for brazing products such as brazing sheet products capable of being brazed into assemblies at a temperature below 570° C.

Controlled Atmosphere Brazing ("CAB") and Vacuum Brazing ("VB") are the two main processes used for industrial scale aluminium brazing. Industrial vacuum brazing has been used since the 1950's, while CAB became popular in the early 1980's after the introduction of the Nocolok (trade mark) brazing flux. Vacuum brazing is an essentially discontinuous process and puts high demands on material cleanliness. The disruption of the oxide layer present is mainly caused by the evaporation of magnesium from the clad alloy. There is always more magnesium present in the furnace then necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. CAB is essentially a continuous process in which, if the proper brazing flux is being used, high volumes of brazed assemblies can be manufactured. The brazing flux dissolves the oxide layer at brazing temperature allowing the clad alloy to flow properly. When the Nocolok flux is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminium surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the brazing flux application. Such a material can be supplied to a manufacturer of brazed assemblies and is ready to use directly after forming of the assembly parts. No additional brazing fluxing operations have to be carried out. Presently, only one process for flux-less brazing is used on an industrial scale. The material for this process can be for example standard brazing sheet made from an AA3000-series core alloy clad on both sides with a cladding of an AA4000-series alloy. Before the brazing sheet can be used the surface has to be modified in such a way that the naturally occurring oxide layer does not interfere during the brazing cycle. The method of achieving good brazing is to deposit a specific amount of nickel on the surface of the clad alloy. If properly applied, the nickel reacts, presumably exothermically, with the underlying aluminium. The nickel can be applied by using a shim of nickel between the two parts to be joined or can be deposited by electroplating. When electroplating is used the adherence of the nickel should be sufficient to withstand typical shaping operations being used in for example heat exchanger manufacture.

The processes for nickel-plating in an alkaline solution of aluminium brazing sheet are known from each of U.S. Pat. No. 3,970,237, U.S. Pat. No. 4,028,200, U.S. Pat. No. 4,164,454, U.S. Pat. No. 4,602,731, and SAE-paper no. 880446 by B. E. Cheadle and K. F. Dockus. According to these documents, nickel or cobalt, or combinations thereof, are most preferably deposited in combination with lead. The lead addition is used to improve the wettability of the clad alloy during the brazing cycle. An important characteristic of these plating processes is that the nickel is preferentially deposited on the silicon particles of the clad alloy. To obtain sufficient nickel for brazing on the surface, the clad alloy should contain a relatively large number of silicon particles to act as nuclei for the nickel deposition. It is believed that to obtain sufficient nucleation sites before pickling a part of the aluminium in which the silicon particles are embedded should be removed by chemical and/or mechanical pretreatment. This is believed a necessary condition to obtain a sufficient nickel coverage to serve as nuclei for the plating action of the brazing or clad alloy. On a microscopic scale the surface of the Si-containing cladding of the brazing sheet is covered with nickel globules.

However, the use of lead for the production of a suitable nickel and/or cobalt layer on brazing sheet has several disadvantages. The plating baths for electroplating are rather complex and due to the presence of lead comprising components such as salts thereof, these baths are much more environmentally unfriendly than plating baths comprising nickel- or cobalt-components alone. The use of lead for manufacturing products, such as automotive products, is undesirable and it is envisaged that in the very near future there might possibly even be a ban on lead comprising products or products manufactured via one or more intermediate processing steps comprising lead or lead-based components.

In the present application, unless otherwise indicated, all percent compositions are in weight percent.

SUMMARY OF THE INVENTION

It is an object of the present invention to provide a brazing product wherein the filler metal has a liquidus temperature below 570° C.

It is an object of the present invention to provide a brazing sheet product wherein the filler metal has a liquidus temperature below 570° C.

It is a further object of the present invention to provide a brazing sheet product having a core sheet (4) made of an aluminium alloy having on at least one surface of the core sheet clad an aluminium clad layer (1), the aluminium clad layer being made of an aluminium alloy comprising silicon in an amount in the range of 2 to 18% by weight, and a layer (2) comprising nickel on the outer surface of the aluminium clad layer, wherein the filler metal has a liquidus temperature below 570° C.

It is a further object of the present invention to provide a brazing product, such as a brazing sheet product having a core sheet (4) made of an aluminium alloy having on at least one surface of the core sheet clad an aluminium clad layer (1), the aluminium clad layer being made of an aluminium alloy comprising silicon in an amount in the range of 2 to 18% by weight, and a layer (2) comprising nickel on the outer surface of the aluminium clad layer, wherein the brazing sheet product has a good brazeability without the mandatory addition of lead to the nickel-layer.

It is a further object of the present invention to provide a brazing product, such as a brazing sheet product, which can be used in a vacuum brazing process as well as in a controlled atmosphere process in the absence of a brazing flux.

It is a further object of the present invention to provide a method of manufacturing such brazing products in accordance with the invention.

In accordance with the invention in one aspect there is provided an aluminium brazing product having a base substrate of an aluminium alloy comprising silicon in an amount in the range of 2 to 18% by weight, and on at least one outer surface a layer comprising nickel, characterised by a separately deposited layer on one side of the layer comprising nickel and the separately deposited layer comprising a metal such that taken together the aluminium base substrate and all layers exterior thereto form a metal filler having a liquidus temperature in the range of 490 to 570° C., and preferably in the range of 510 to 550° C.

With the invention there is provided a brazing product which may be employed for brazing at significantly lower temperatures as compared to traditional brazing temperatures, while achieving a very strong bonding. The brazing product according to the invention may be applied in both vacuum brazing and fluxless brazing under controlled atmosphere conditions, but there is a preference for the application of fluxless CAB.

In an embodiment of the aluminium brazing product the aluminium base substrate is an aluminium alloy sheet or aluminium alloy wire or rod. The aluminium base substrate is preferably made of an AA4000-series aluminium alloy. Such an AA4000-series aluminium alloy sheet or strip, typically having a gauge in the range of up to 3 mm, and preferably in the range of 0.04 to 2 mm, may be employed in a brazing operation. The sheet or strip is preferably plated on both sides with the layer comprising nickel and the further metal layer in accordance with the invention, and whereby during a brazing operation essentially the whole brazing product melts to form the metal filler. A similar approach can be used for applying multiple metal layers on AA4000-series aluminium alloy wires or rods. Such plated wires or rods may be employed in a brazing operation or used as filler metal in a welding operation, such as for example laser welding operations.

In an embodiment, the brazing product forms a brazing sheet product having a core sheet made of an aluminium alloy, and which during a brazing operation does not melt and does not form at least part of the filler metal. The brazing sheet has on at least one surface of the core sheet coupled, for example by means of cladding, the aluminium base substrate set out above and which can in the case of brazing sheet also be referred to as an aluminium clad layer, the aluminium clad layer being made of an aluminium alloy comprising silicon in an amount in the range of 2 to 18% by weight, typically an AA4000-series alloy, and a layer comprising nickel on the outer surface of the aluminium clad layer, characterised by a separately deposited layer on one side of the layer comprising nickel and the separately deposited layer comprising a metal such that taken together the aluminium clad layer and all layers exterior to the aluminium clad layer (and exterior to the core sheet) form a metal filler having a liquidus temperature or melting temperature in the range of 490 to 570° C., and preferably in the range of 510 to 550° C.

With the brazing sheet product according to the invention there is provided a brazing sheet which may be employed to braze at significantly lower temperatures as compared to traditional brazing temperatures, and achieving a very strong bonding. The brazing sheet product according to the invention may be applied in both vacuum brazing and fluxless brazing under controlled atmosphere conditions, but there is a preference for the application of fluxless CAB. The brazing sheet product may be manufactured on an industrial scale without the laborious use of thin rolled metal sheets, which are difficult to manufacture themselves. With the brazing sheet product according to the invention it is possible to braze more unusual metals to each other, for example aluminium sheet or extrusion core alloys made of AA5000-series alloys having Mg in a range up to 6% may be employed now in a fluxless CAB operation. At least also aluminium alloys from the AA3000 and AA6000-series aluminium alloys may be used as core alloy.

In an embodiment of the brazing product according to the invention the layer comprising a metal such that taken together the aluminium base substrate, or alternatively the aluminium clad layer, and all layers exterior thereto form a metal filler having a liquidus temperature in the range of 490 to 570° C., and preferably in the range of 510 to 550° C., and most preferably in the range 510 to 540° C., comprises copper or copper-based alloy, and more preferably the layer comprises at least 60% by weight copper. Suitable copper-based alloys may be brass or bronze.

Preferably the applied layer comprising copper or copper-based alloy has a thickness up to 10 micron, more preferably up to 7 micron. In the best results a thickness of about 4 micron has been used.

In particular copper has been found to significantly reduce the liquidus temperature of the metal filler. However, further metal layers of for example zinc or tin may be applied in addition thereto.

In an embodiment of the brazing product according to the invention aluminium base substrate or alternatively the aluminium clad layer comprises Si in a range of 2 to 18% by weight, and preferably 5 to 14%. And further optionally at least Mg in a range of up to 8% by weight, and preferably up to 5% by weight, and more preferably in a range of 0.05 to 2.5% by weight.

In a further embodiment the aluminium base substrate or alternatively the aluminium clad layer of the brazing sheet product comprises, in weight percent:

| | |
|---|---|
| Si | 2 to 18, preferably 5 to 14 |
| Mg | up to 8, preferably up to 5 |
| Zn | up to 5.0 |
| Cu | up to 5.0 |
| Mn | up to 0.5 |
| In | up to 0.3 |
| Fe | up to 0.8 |
| Sr | up to 0.2 | optionally one or more elements selected from the group consisting of:

| | |
|---|---|
| Bi | 0.01 to 1.0 |
| Pb | 0.01 to 1.0 |
| Li | 0.01 to 1.0 |
| Sb | 0.01 to 1.0 | impurities each up to 0.05, total up to 0.20 balance aluminium.

This aspect of the invention is based on the insight that the aluminium clad layer may comprise one or more elements selected from the group consisting of bismuth, lead, lithium and antimony, each in a range of 0.01 to 1.0%, and the combination of two or more elements does preferably not exceed 2.5%. In accordance with the invention it has been found surprisingly that the nickel layer itself does not need to comprise any lead as a mandatory alloying addition. Surprisingly it has been found that an equal or even better results can be obtained if one or more elements of the group Bi, Pb, Li, and Sb is being added in the given ranges to the aluminium clad layer itself. The addition of lead to the aluminium clad layer is very effective, however, its addition from an environmentally point of point is preferably avoided. Further alloying elements may be added to improve specific properties of the aluminium alloy clad layer. Magnesium may be present in the base substrate or alternatively in the clad layer in a range of up to 8%, and preferably in a range of 0.2 to 5%, and more preferably 0.5 to 2.5%, as an alloying element to increase amongst others the strength of the base substrate or the aluminium clad layer. In accordance with the invention it has been found also that magnesium in the range of 0.2 to 2% may also act in a similar way as elements selected from the group of bismuth, lead, lithium and antimony. Preferably the magnesium level does not exceed 2%, when it is present essentially only to promote the wetting action of the aluminium in combination with the lead-free nickel layer. In case magnesium in the clad layer is present in an amount of more than 2% it is preferably accompanied with one or more elements selected from the group consisting of bismuth, lead, lithium and antimony in the given ranges, and whereby the combination of two or more elements from this group does preferably not exceed 1.0%. It has been found also that in use of the brazing product the presence of magnesium in the base substrate or the aluminium clad layer has no detrimental effects during a brazing operation. This is a major improvement over known brazing products. It allows that Mg-containing brazing products may be applied in both VB and flux-less CAB. The latter possibility has many economical and technical advantages.

In an embodiment of the brazing product according to the invention the layer comprising nickel further comprises bismuth in a range up to 5% by weight. In accordance with the invention it has been found surprisingly that the nickel layer does not need to comprise any lead as a mandatory alloying addition in order to achieve good brazeability. Surprisingly it has been found that equal or even better results can be obtained if bismuth is added to the nickel layer, such that the nickel layer can be kept essentially lead-free and simultaneously also in the plating bath used for the deposition of such a Ni—Bi alloy layer.

Preferably in this brazing product the layer comprising nickel and bismuth has a thickness up to 2 μm, preferably up to 1.0 μm, and more preferably up to 0.5 μm. A coating thickness of greater than 2 μm requires a prolonged treatment time for plating, may result in wrinkling of the molten filler material during subsequent brazing. A preferred minimum thickness for this Ni—Bi-containing layer is about 0.25 μm. Also, other techniques such as thermal spraying, Chemical Vapor Deposition ("CVD") and Physical Vapor Deposition ("PVD") may be used.

In an embodiment the brazing product, in particularly the brazing sheet product, according to the invention is further characterised by a layer comprising zinc or tin as a bonding layer between the outer surface of the base substrate, or alternatively the aluminium clad layer, and the layer comprising nickel. By the zinc or tin comprising bonding layer a very effective bond between the aluminium alloy clad layer and the layer comprising nickel is formed, the bond remaining effective during subsequent deformation of the brazing sheet, for example by bending. The coverage of the nickel layer is no longer dependent on the surface characteristics of the bare clad layer. The brazing product obtained is suitable for flux-less brazing under controlled atmosphere conditions.

The invention is based in part on the insight that to obtain a well-bonded nickel layer on the Si-containing aluminium layer of the brazing product so that the bond remains effective under large deformation, pre-treatment of the aluminium clad layer is extremely important. The prior art processes apparently aimed at applying the nickel in a distributed form, principally to the silicon particles at the surface of the aluminium clad layer, rather than trying to achieve a uniform nickel layer. In the present invention the surface of the Si-containing aluminium alloy is altered in such way that the nickel coverage is independent of the silicon particles at its surface. The nickel plating does not take place on the silicon particles but on the applied bonding layer comprising zinc or tin. Since the nickel thus is deposited on the total surface of the base substrate, or alternatively the aluminium clad layer, the necessary reaction before brazing can take place much more easily as compared to the process of the prior art. The zinc or tin applied does not interfere at all during the brazing process, and may contain a component to assist the brazing. Since the nickel is deposited smoothly and uniformly on the surface, the use of lead to promote wetting during brazing can be reduced or avoided, or other elements such as bismuth may be used for this purpose. A further important advantage of the nickel deposited smoothly and uniformly on the surface is that the total amount of nickel to be applied in order to achieve good flux-less brazing can be reduced. Another advantage is that the complete surface coverage avoids any difficulty caused by aluminium oxide at the surface of the clad layer.

Preferably, the applied layer comprising zinc or tin has a thickness up to 0.5 μm, more preferably up to 0.3 μm (300 nm), and most preferably in the range of 0.01 to 0.15 μm (10–150 nm). In the best results obtained a thickness of about 30 nm has been used. A coating thickness of greater than 0.5 μm requires a prolonged treatment time, e.g. for displacement plating, and is thought to have no further advantages for improving the adhesion.

In an embodiment of the brazing sheet product the aluminium alloy clad layer has a thickness ranging from about 2 to 20% of the total thickness of the total brazing sheet product thickness. Typical aluminium clad layer thickness is in the range of 40 to 80 micron. The core sheet has a thickness typically in a range of up of 5 mm, more preferably in the range of 0.1 to 2 mm.

In an embodiment, the core sheet is an aluminium alloy comprising magnesium in a range of up to 8%. In a preferred embodiment magnesium is in a range of 0.5 to 5%. Further alloying elements may be added in suitable ranges. It has been found that when the brazing sheet product of the invention is used, the presence of magnesium in the clad layer has no detrimental effects during brazing. This is considered a major improvement over the known brazing sheets. The diffusion of Mg from the core to the cladding during the manufacturing of the brazing sheet product itself and its application in a subsequent brazing process, appears to have no detrimental effects on the brazeability of the brazing sheet product in accordance with the invention. This allows for the design of high strength brazing sheet products having an aluminium core sheet having magnesium in the given range as an important strengthening element. The brazing sheet product may be applied in both Vacuum Brazing ("VB") and flux-less Controlled Atmosphere Brazing ("CAB"), both processes being used extensively on an industrial scale.

An embodiment of the brazing product according to this invention is characterised in that taken together the aluminium base substrate or alternatively the aluminium clad layer and all layers exterior thereto, have a composition comprising at least, by weight percent:

Si in the range of 5 to 10%, preferably 7 to 10%,
Cu in the range of 12 to 25%, preferably 12 to 18%,
Bi in the range up to 0.25%,
Ni in the range of 0.05 to 4%, preferably 0.05 to 3%,
Zn in the range up to 20%, preferably up to 5%, more preferably up to 0.25%,
and still more preferably up to 0.15%,
Sn in the range up to 5%,
Mg in the range up to 5%,
balance aluminium and impurities.

A typical impurity element may be iron, in particular originating from the aluminium base substrate or aluminium clad layer, and which may be tolerated up to 0.8%. Other alloying elements may be present, and will typically, but not exclusively, originate from the aluminium base substrate or alternatively the aluminium clad layer.

In this embodiment a metal filler is obtained which has a liquidus temperature in the range of 510 to 550° C., and allows for the manufacturing of brazed assemblies or use as a filler wire at significant lower temperatures compared to traditional industrial scale brazing temperatures.

In another aspect of the invention there is provided in a method of manufacturing the brazing product set out above, such as a brazing sheet product, the method being characterised in that the aluminium brazing product is typically plated with nickel by electroplating in an alkaline solution. Good results may be obtained when the electroplating process for nickel deposition comprises one or more of:

(a) bath temperature 20 to 70° C., preferably 20 to 30° C.;
(b) pH 7 to 12, preferably pH 10 to 12, and more preferably about 10.5;
(c) current density of 0.1 to 10 A/dm2, preferably 0.5 to 4 A/dm2;
(d) plating time 1 to 300 seconds, preferably 30 to 100 seconds;
(e) bath composition comprising 3 to 200 g/l nickel sulphate, preferably 50 g/l nickel sulphate, 10 to 100 g/l nickel chloride, preferably 50 g/l nickel chloride, 60 to 300 g/l sodium citrate, preferably 100 g/l sodium citrate, 5 to 150 ml/l ammonium hydroxide (30% by weight), preferably 75 ml/l ammonium hydroxide. As alternative for the sodium citrate 60 to 300 g/l sodium gluconate, preferably 150 g/l sodium gluconate may be used, preferably 1 g/l lead citrate or bismuth lactate may be used.

Using these parameters in combination with the bonding layer in accordance with the invention, a well-bonded layer comprising essentially nickel is applied to the brazing sheet, the bonding remaining effective under large deformation of the nickel-plated brazing sheet and the deposition of the plating layer being independent of the silicon particles at the surface of the clad layer. A further advantage is that it is possible to perform a continuous process.

Alternatively, according to the method of the invention the aluminium brazing product is plated with nickel by electroplating in an acidic solution. Good results may be obtained when in the electroplating process for nickel deposition the parameters comprise one or more of:

(a) bath temperature 20 to 70° C., preferably 40 to 60° C.;
(b) pH in the range of 3 to 5, preferably 4 to 5;
(c) current density of 0.1 to 10 A/dm2, preferably 0.5 to 5 A/dm2;
(d) plating time 1 to 300 seconds, preferably 20 to 100 seconds;
(e) bath composition comprising 5 to 400 g/l nickel sulphate, preferably 240 to 300 g/l nickel sulphate, 10 to 100 g/l nickel chloride, preferably 40 to 60 g/l nickel chloride, 5 to 100 g/l boric acid, preferably 25 to 40 g/l boric acid.

Such an electroplating process is often referred to in the act as the Watt's process. Using these parameters in combination with the bonding layer in accordance with the invention, a well-bonded layer comprising essentially nickel may be applied to the brazing product, the bonding remaining effective under large deformation of the nickel-plated brazing product, such as brazing sheet, and the deposition of the plating layer being independent of the silicon particles at the surface of the clad layer. A further advantage is that it is possible to perform a continuous process.

Alternatively, according to the method of the invention the aluminium brazing product is nickel plated by electroplating in an acid solution comprising nickel using alkylsulphonic acid electrolytes, and preferably methanesulphonic acid.

Alternatively, according to the method of the invention the aluminium brazing product is plated with nickel by electroplating in a sulfamate solution. Typically the sulfamate solution comprises 50 to 500 g/l nickel sulfamate, 15 to 50 g/l boric acid, and optionally wetting agents. Bath temperatures are in the range of 20 to 70° C.

Alternatively, according to the method of the invention the aluminium brazing product is plated with nickel by electroplating in a fluoborate solution. Typically nickel fluoborate is present in the range 50 to 500 g/l, and further optionally fluoboric acid in the range 1 to 50 g/l, boric acid 15 to 50 g/l, and further optionally a wetting agent. Bath temperatures are in the range of 20 to 80° C., and preferably 40 to 70° C. An advantage is that this solution, like some others here described, does not require the use of ammonium hydroxide.

Alternatively, according to the method of the invention the aluminium brazing product is plated with nickel by electroplating in a bath comprising 50 to 500 g/l nickel acetate, 15 to 50 g/l boric acid, up to 200 ml/l glycolic acid (70%), 20 to 100 g/l sodium acetate, and optionally wetting agents.

In an embodiment of the method according to the invention, the method is characterised in that the layer comprising nickel is deposited by electroplating both nickel and bismuth using an aqueous bath comprising a nickel-ion concentration in a range of 10 to 100 g/l and a bismuth-ion concentration in the range of 0.01 to 10 g/l.

In accordance with the invention it has been found surprisingly that the nickel layer does not need to comprise any lead as a mandatory alloying addition in order to achieve good brazeability. Surprisingly it has been found that equal or even better results can be obtained if bismuth is added to the nickel layer, such that the nickel layer can be kept essentially lead-free and simultaneously also in the plating bath used for the deposition of this Ni—Bi layer. By using this aqueous plating bath the need for the addition of lead has been overcome, which is a significant achievement from an environmental point of view.

In another aspect of the invention there is provided a method of manufacturing the brazing product, such as brazing sheet, characterised in that the layer comprising nickel being deposited by plating both nickel and bismuth using an aqueous bath comprising a nickel-ion concentration in a range of 20 to 70 g/l and a bismuth-ion concentration in the range of 0.02 to 5 g/l.

The nickel-ion concentration to the aqueous bath can be added via the addition of nickel chloride, nickel fluoborate, nickel sulfamate, nickel acetate or nickel sulphate. However, there is a preference to use the addition of nickel sulphate ($NiSO_4$). At a too high level of nickel salt in the aqueous bath there is the risk of the crystallisation of the salt in the solution, which might damage a continuous process. At too low levels the resultant bath becomes uneconomical due to too long plating times and low current density.

Bi-ion in the concentration set out above can be added in various ways to the aqueous bath. In theory many bismuth compounds could be used for this purpose. However, many bismuth compounds have been tried out but only very few appear to provide reliable and reproducible results. For example the addition of bismuth acetate has been tried, but it has been found that this compound did not dissolve in the plating bath used, whereas the addition of lead acetate did not result in any problems with respect to having this compound dissolved. For example also the combination of a bath of nickel-ions and bismuth-ions and a tartrate at a pH in the range of more than 8 resulted in the formation of an undesirable Ni containing sludge. This Ni containing sludge did not dissolve upon heating, indicating amongst others that Ni is unstable in the presence of a tartrate in the mentioned pH range. In accordance with the invention very good results have been obtained when Bi-ions are being added via the addition of one or more of the group consisting of bismuth carbonate ($Bi_2(CO_3)_3$), bismuth oxide ($Bi_2O_3$), bismuth citrate ($BiC_6H_5O_7$) and bismuth chloride ($BiCl_3$). Optionally some sodium hydroxide may be added also to regulate the pH of the aqueous bath. By using bismuth carbonate or bismuth oxide in the presence of nickel a suitable plating bath has been obtained which is stable at a very wide pH range. At too high levels of Bi-ion concentration in the aqueous bath the resultant deposit has an undesired high Bi-concentration. Preferably, the Bi-concentration in the resultant Ni—Bi layer on the brazing sheet product is not more than 5 percent by weight, and preferably not more than 3 percent by weight. At too low levels the resultant bath becomes uneconomical due to too long plating times and low current density.

In an embodiment of the method of the invention the layer comprising nickel being deposited by plating both nickel and bismuth using an aqueous bath having:

a pH in the range of 2.5 to 10, and comprising a nickel-ion concentration in a range of 10 to 100 g/l, and preferably in a range of 20 to 70 g/l, a bismuth-ion concentration in the range of 0.01 to 10 g/l, and preferably in the range of 0.02 to 5 g/l, a citrate-ion concentration in the range of 40 to 150 g/l, and preferably in the range of 80 to 110 g/l, a gluconate-ion concentration in the range of 2 to 80 g/l, and preferably in the range of 4 to 50 g/l, a chloride- or fluoride-ion concentration in the range of 1 to 50 g/l, and preferably in the range of 1 to 30 g/l.

This aqueous plating bath demonstrated to be operational in a very wide pH range, and can be used on industrial scale coil plating lines using a high current density, which in turn allows for fairly high line speeds. Further advantages of this plating bath are that it does not generate any ammonia fumes, it can be composed using standard and readily available chemicals, and bismuth can easily be replenished to the plating bath from a bismuth concentrate or otherwise.

Baths using the following salts have proved particularly effective, in grams per liter:

Nickel sulphate in a range of 45 to 450 g/l, and preferably 90 to 315 g/l,

Chloride-ion concentration in a range of 1 to 50 g/l, and preferably 1 to 30 g/l, Sodium citrate in a range of 55 to 180 g/l, and preferably 110 to 150 g/l, Sodium gluconate in range of 2 to 90 g/l, and preferably 5 to 55 g/l, Ammonium sulphate in a range up to 270 g/l, Bismuth oxide in a range of 0.02 to 22 g/l, and preferably 0.05 to 11 g/l, or Bismuth carbonate in a range of 0.03 to 29 g/l, and preferably 0.06 to 14 g/l.

The addition of an ion from the group consisting of chloride and fluoride is required for inducing anode corrosion. A suitable source of chloride-ion concentration can be done by the addition of nickel chloride ($NiCl_2 \cdot 6H_2O$) in a range of up to 415 g/l, and preferably in a range up to 250 g/l.

($H^+$) or ($OH^-$) can be added to regulate the pH in a range of 2.5 to 10. The use of ammonium hydroxide should preferably be avoided in view of the generation of ammonia fumes.

Optionally for reducing stress in the deposit layer comprising the Ni and Bi an ammonium-ion concentration in a range up to 40 g/l, and preferably in range of 1 to 25 g/l, or a triethanolamine-ion concentration in a range of up to 40 g/l, or combinations thereof, or other equivalent components may be added to the aqueous bath. Any soluble ammonium salt can be used as a source of $NH_4^+$.

The plating bath used in the method according to the invention can operate in a wide pH range of 2.5 to 10, and preferably in the range of 4 to 8, without affecting the properties of the bath and without dissolving the aluminium base substrate or the aluminium clad layer in case of a brazing sheet product. If the base substrate or clad layer is provided with a zinc layer, e.g. by means of a zincate treatment via direct or immersion plating, prior to the plating of the Ni—Bi layer, the pH is preferably in the range of 5 to 8, and more preferably in the range of 5.4 to 7.5.

The method according to the invention is preferably employed using a plating bath having a temperature in the range of 30 to 70° C., and more preferably in the range of 40 to 65° C. In this temperature range the ion-mobility increases and there is no need to cool the plating bath to compensate for the heat generation during plating.

In an embodiment the method according to this invention is characterised in that the bonding layer comprising zinc or tin is applied by a direct zinc plating treatment, or by a zincate treatment or a stannate treatment. Very good results may be obtained with an immersion zincate treatment or immersion stannate treatment, often also referred to as displacement plating. A further advantage is that this treatment lends itself to application in a continuous process operation.

Preferably the duration of the zincate treatment or stannate treatment is in the range of 1 to 300 seconds.

Preferably the temperature of the bath during the zincate treatment or stannate treatment is in the range of 10 to 50° C., and more preferably in the range of 15 to 30° C. Zincate treatments are known per se in the art for applying layers onto aluminium, for example as known from "Oppervlaktebehandelingen van aluminium" by T. van-der-Klis and J. W. du-Mortier published by the Vereniging voor Oppervlaktetechnieken voor Materialen, Bilthoven, NL, 3rd edition 1992, pp. 406–409. A simple basic composition for a zincate pickle comprises 40–50 g/l ZnO and 400–500 g/l NaOH. Also, other commercial available zincate baths can be used, for example ChemTec (tradename) 024202, also known as the Bondal process, and ChemTec (tradename) 024195, also known as a cyanide-free Bondal process.

Stannate treatments are known in the art for depositing a layer on aluminium to facilitate soldering, to improve electrical conductivity, and also to give a lubricated surface to aluminium alloy pistons for internal combustion engines during the running-in period. Typical alkaline stannate solutions comprise 5 to 300 g/l sodium or potassium stannate.

The zinc or tin layer applied in the method of the invention may be essentially a pure zinc or tin layer or may be primarily zinc or tin (e.g. at least 50 weight %). Minor amounts of impurity elements or deliberately added elements may be present, as discussed in more detail below. Typically impurity elements are present at less than 10%, more usually less than 5% by weight in the zinc or tin layer. The zinc or tin layer may contain less than 1% of other elements.

In an embodiment of the method according to the invention this method is characterised in that the layer (3) comprising copper or copper-based alloy being deposited by electroplating. However, other techniques such as thermal spraying, plasma spraying, Chemical Vapor Deposition ("CVD") and Physical Vapor Deposition ("PVD") or other known techniques for depositing of metals or metal alloys from a gas or vapor phase may be used.

In an embodiment of the method according to the invention this method is characterised in that the layer (3) comprising copper or copper-based alloy is deposited by plating copper or copper-alloy using an aqueous alkaline copper-cyanide based plating bath.

In an embodiment of the method according to the invention this method is characterised in that the layer (3) comprising copper or copper-based alloy is deposited by plating copper or copper-alloy using an aqueous copper-phosphate based plating bath. This aqueous plating bath demonstrated to be operational in a wide pH range, and can be used on industrial scale plating lines using a high current density, which in turn allows for fairly high line speeds. It can be composed using standard and readily available chemicals, and copper can easily be replenished to the plating bath.

Baths using the following salt have proved particularly effective, in grams per liter:

a pH in the range of 7 to 11;

copper-phosphate in a range of 5 to 200 g/l, and preferably 20 to 150 g/l, in particular copper-pyrophosphate has proven to be a suitable salt, potassium-pyrophosphate in a range of 50 to 700 g/l, and preferably 150 to 400 g/l, optionally citric acid in a range of 2 to 50 g/l, and preferably 4 to 25 g/l, optionally ($OH^-$) can be added to regulate the pH in a range of 7 to 11.

The method according to the invention is preferably employed using a plating bath having a temperature in the range of 30 to 70° C., and more preferably in the range of 40 to 65° C. In this temperature range the ion-mobility increases and there is no need to cool the plating bath to compensate for the heat generation during plating.

In a further aspect of the invention there is provided in a method of manufacturing a brazed assembly using the brazing sheet product in accordance with the invention or obtained by the method according to the invention, comprising the sequential process steps of:

(a) shaping parts of which at least one is made from brazing sheet product according to the invention;

(b) assembling the parts into the assembly;

(c) brazing the assembly under a vacuum or in an inert atmosphere in the absence of a brazing-flux at elevated temperature, preferably at a temperature in the range of 490 to 570° C., and more preferably in the range of 510 to 550° C., for a period long enough for melting and spreading of the molten filler;

(d) cooling the brazed assembly.

Depending upon the aluminium alloy of the core sheet the process may include the further processing step (e) of ageing of the brazed and cooled assembly in order to optimise the mechanical and/or corrosion properties of the resultant assembly.

The use of the brazing sheet product in accordance with the invention has been found to result in a significant lower brazing temperature. This reduced brazing temperature allows for a significant reduction of the industrial scale processing time for a whole brazing cycle, typically a time reduction of 25% or more has been found.

In an embodiment of the method of manufacturing a brazed assembly in step (a) at least one of the parts to be joined by brazing is made of the brazing sheet product in accordance with the invention set out above, and at least one other part is selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

The invention further provides a brazed assembly manufactured in accordance with the invention described above. In its preferred embodiments the brazed assembly is a heat-exchanger, typically for automotive applications, or a fuel-cell, typically an electrochemical fuel cell.

BRIEF DESCRIPTION OF THE DRAWING

The invention will now be illustrated by several non-limitative examples, and with reference to the drawings, wherein.

DESCRIPTION OF PREFERRED EMBODIMENTS

Figure 1:
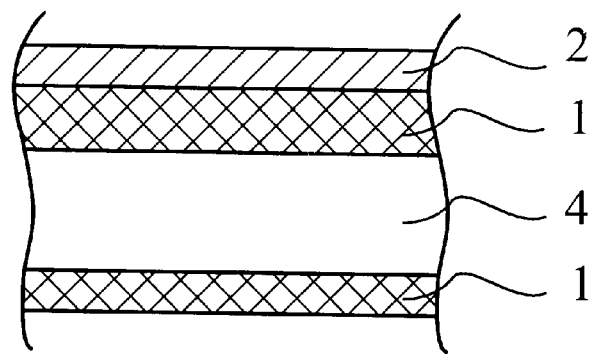
FIG. 1 is a schematic longitudinal section showing the structure of brazing sheet product according to the state of the art.

FIG. 1 shows schematically brazing sheet in accordance with the prior art as would be obtained by the process in accordance with for example U.S. Pat. No. 3,970,237. The brazing sheet product consists of a core sheet 4 on one or both sides clad with an aluminium clad layer 1 comprising an Al—Si alloy. On top of the clad layer 1 a thin nickel layer 2, preferably a nickel-lead layer, is applied by means of electroplating.

Figure 2:
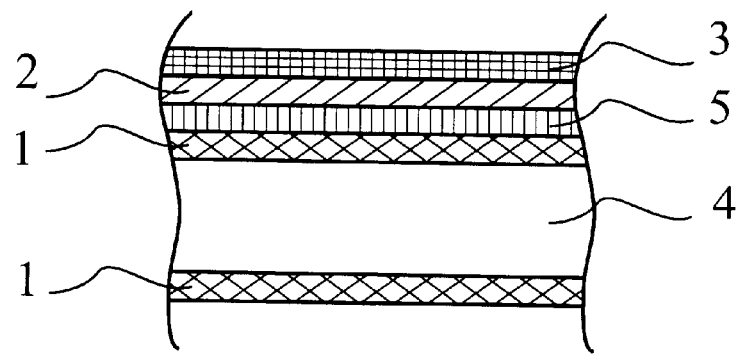
FIG. 2 is a schematic longitudinal section showing the structure of brazing sheet product according to the invention.

FIG. 2 shows schematically brazing sheet in accordance with the present invention in which between the clad layer 1 (also known as base substrate 1) and the thin nickel layer 2 an optional further bonding layer 5 of zinc or tin is applied, the advantages of which are set out above. In FIG. 2 the layers 1, 5, 2 and 3 have been shown on only one side of the brazing sheet, but it will be immediately apparent to the skilled person that they may also be applied on both sides of the brazing sheet product. Thus, if desired, the clad layer 1 shown to only contact the core 4, may be further provided with other layers, e.g., layers 2, 3, 5 as is the other clad layer 1. In accordance with the invention there is provided a further metal layer 3, preferably comprising copper, to reduce the liquidus temperature of the metal filler formed by the clad layer 1 and all layers exterior thereto on its one side of the core sheet. The further metal layer 3 may be applied on top of the nickel layer 2 (as shown) or underneath the nickel layer 2 (not shown). The compositions of the various layers and their advantages have been set out above. FIG. 2 shows two layers 1 contact the core layer, the bonding layer 5 contacts one clad layer 1 and the thin nickel layer 2, and metal layer 3 contacts the thin nickel layer 2.

Figure 3:
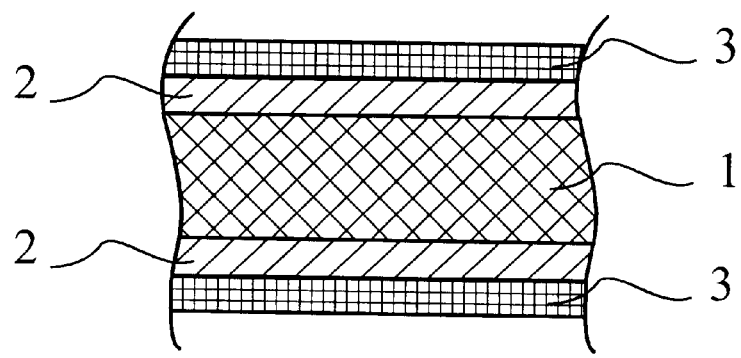
FIG. 3 is a schematic longitudinal section showing the structure of brazing product according to the invention.

FIG. 3 shows schematically a brazing product in accordance with the present invention that does not have the core layer 4 of FIG. 2. In FIG. 3 the base substrate 1 comprising an Al—Si alloy is provided on both sides with a nickel layer 2, and on this nickel layer 2 there is applied a further metal layer 3, preferably comprising copper, to reduce the liquidus temperature of the metal filler formed by the base substrate 1 and all layers exterior thereto. The brazing product shown in FIG. 3 is not provided with a bonding layer 5 (FIG. 2) of zinc or tin, but it will be immediately apparent to the skilled person that such a bonding layer may be applied here also. The composition of the various layers and their advantages have been set out above.

EXAMPLES

Example 1

On a laboratory scale aluminium brazing sheets manufacture from an AA3003 core alloy clad by means of roll bonding on both sides with an AA4045 clad alloy (see Table 1), and having a total thickness of 0.5 mm and whereby each clad layer thickness is 50 microns, have been pre-treated by alkaline etching and desmutting with intermediate rinsing and subsequently on both sides plated with various different metal layers, see also Table 2.

A thin zinc layer of about 30 nm has been applied using a zincate immersion treatment using ChemTec (trade name) 024202 for 12 s at room temperature.

A nickel-lead layer has been applied using a basic bath comprising 50 g/l nickel sulphate, 50 g/l nickel chloride, 30 g/l sodium citrate, 1 g/l lead-acetate, 75 ml/l ammonium hydroxide (30%). The plating conditions at 26° C. were such that a plating time of 50 seconds resulted in a nickel-lead plated layer of 0.5 micron thickness using a current density of 3 A/dm$^2$.

A nickel-bismuth layer has been applied using a plating bath having the composition of Table 3 and having a pH of 5.5. The Bi-ion concentration has been added to the plating bath using a Bi-ion concentrate of 160 g/l sodium hydroxide, 300 g/l sodium gluconate and 110 g/l bismuth oxide. The bismuth oxide could have been replaced also by bismuth carbonate. The electroplating of a Ni—Bi layer was performed at 57° C.

A copper layer is applied by electroplating using an alkaline cyanide plating bath comprising 110 g/l copper (I)cyanide, 140 g/l sodium cyanide, 90 g/l sodium carbonate, and the plating conditions were such that different plating times have been applied resulting in different layers thickness by a current density of 3 A/dm$^2$ at a temperature of 50° C. The current efficiency for the copper plating was about 70%.

As reference material commercially available brazing sheet has been used manufactured in accordance with the process described in U.S. Pat. No. 3,970,237, and indicated as "REF" in Table 2.

For example, sample 3 of Table 2 had the following subsequent metal layers on each side of the core sheet: AlSi alloy clad layer, zinc layer, NiBi-layer, and finally a copper layer.

The composition and weight of the applied layers on both sides was determined by ICP ("Inductively Coupled Plasma"). The results per side of the core sheet have been listed in Table 2. The term "n.m." stands for not-measured.

The plated specimens have been tested for adhesion using the Erichsen dome test (5 mm), and the T-bend test. A value assessment is then given to the adhesion where: (−)=poor, (±)=fair, and (+)=good. The results are given in Table 2. Further the brazeability has been assessed. On a laboratory scale of testing the brazing tests were carried out in a small quartz furnace. Small coupons of 25 mm×25 mm were cut from the plated specimen sheets. A small strip of an AA3003 alloy measuring 30 mm×7 mm×1 mm was bent in the center to an angle of 45° and laid on the coupons. The strip on the coupon samples were heated under flowing nitrogen, with heating from room temperature to 580° C., dwell time at 580° C. for 1 minute, cooling from 580° C. to room temperature. The brazing process was judged on possible formation of wrinkles, capillary depression and fillet formation. An overall assessment was given where: (−)=poor brazeability, (−/±)=fair brazeability, (±)=good brazeability, and (+)=excellent brazeability. The results obtained are summarised in Table 2.

For each plating specimen the melting range of the applied metal filler formed by the aluminium clad layer and all layers exterior thereto has been measured by DSC ("Differential Scanning Calorimeter"). Such measurements provided a melting range whereby the higher temperature represents the liquidus temperature, often referred to as the melting temperature.

From the results of Table 2 it can be seen that a zincate treatment in accordance with the invention succeeds in achieving good adhesion of the Ni-plated plated when in contact with the thin layer.

Further it has been found that a very thin layer of zinc has no influence on the melting range of the resultant filler metal.

From the comparison of sample 3 and 8 it can be seen that the sequence of the metal layers has an influence on the brazeability of the filler metal. Preferably the copper layer is being applied on top of the layer comprising nickel (sample 3).

From the samples comprising a Ni—Bi layer it can be seen that the addition on lead is not an essential element to achieve an excellent fluxless CAB brazeability, similar or even better results may be obtained when bismuth is present in the layer comprising nickel. However, the bismuth may also be added to for example the aluminium clad layer.

From the comparison of samples 5, 6 and 7 it can be seen that the presence of a layer comprising Ni is required the obtain a good brazeability in a fluxless CAB brazing environment.

In the best example, being sample 3, the thickness of the Ni—Bi layer was about 0.5 micron and the thickness of the copper-layer was about 4 micron.

The multiple plating operations, or other techniques of applying a metal layer, according to the invention may be applied also on one or both sides of an aluminium alloy sheet or strip made of an AA4000-series aluminium alloys, which aluminium alloy sheet is not being provided with a core sheet to form a brazing sheet product. Such an AA4000-series aluminium alloy sheet or strip, typically having a gauge in the range of up to 3 mm, and preferably in the range of 0.04 to 2 mm, may be employed also in a brazing operation as set out in this example. A similar approach can be used for plating multiple metal layers on AA4000-series aluminium alloy wires or rods. Such plated wires or rods may be employed in a brazing operation as set out in this example or used as filler material in a welding operation, such as for example laser welding operations.

TABLE 1

| Element | AA 3003 | AA 4045 |
|---|---|---|
| Si | <0.6 | 9.0–11.0 |
| Fe | <0.7 | <0.8 |
| Cu | 0.05–0.20 | <0.3 |
| Mn | 1.0–1.5 | <0.05 |
| Mg | — | <0.05 |
| Zn | <0.10 | <0.10 |
| Ti | — | <0.20 |
| others | each<0.05 total<0.15 | each<0.05 total<0.15 |
| balance | Al | Al |

TABLE 2

| Sample | 1 | 2 | 3 | 4 | 5 | 6 | 7 | 8 | REF |
|---|---|---|---|---|---|---|---|---|---|
| Zn immersion | ✓ | − | ✓ | ✓ | ✓ | ✓ | − | ✓ | |
| rinsing | ✓ | ✓ | ✓ | ✓ | ✓ | ✓ | ✓ | ✓ | − |
| NiPb plating | ✓ | ✓ | − | − | − | − | − | − | |
| NiBi plating | − | − | ✓ | ✓ | ✓ | − | − | ✓ | |
| rinsing | ✓ | ✓ | ✓ | ✓ | ✓ | ✓ | ✓ | ✓ | |
| Cu plating [s] | − | − | 194 | 258 | 323 | 258 | 258 | 258 | |
| rinsing | ✓ | ✓ | ✓ | ✓ | ✓ | ✓ | ✓ | ✓ | |
| plating order | Zn NiPb | NiPb | Zn NiBi Cu | Zn NiBi Cu | Zn NiBi Cu | Zn Cu | Cu | Zn Cu NiBi | |
| element | composition metal filler [weight %], balance aluminium | | | | | | | | |
| Zn | 0.1 | − | 0.1 | 0.1 | 0.1 | 0.1 | − | 0.1 | − |
| Ni | 3.2 | 3.2 | 2.6 | 2.5 | 2.3 | − | − | 2.5 | 11.6 |
| Pb | 0.2 | 0.1 | − | − | − | − | − | − | 0.3 |
| Bi | − | − | 0.1 | 0.1 | 0.1 | − | − | 0.1 | − |
| Cu | − | − | 15.9 | 19.8 | 24.2 | 22.8 | 22.4 | 20.4 | − |
| Si | 9.7 | 9.7 | 8.1 | 7.8 | 7.3 | 7.7 | 7.8 | 7.6 | 9.4 |
| adhesion | + | − | + | + | + | + | − | − | ± |
| brazeability | + | + | + | + | + | − | − | − | + |
| melting range (° C.) | 565 575 | 565 575 | 525 550 | 525 545 | 525 540 | 520 543 | 522 558 | 523 543 | 570 578 |

TABLE 3

| Compound | Concentration [g/l] |
|---|---|
| Nickel sulphate | 142 |
| Ammonium sulphate | 34 |
| Nickel chloride | 30 |
| Sodium citrate | 140 |
| Sodium gluconate | 30 |
| Bismuth ions | 1 |

Example 2

Sample 3 of Example 1 has been repeated but instead of an AA4045 clad layer an clad layer comprising, in weight percent, 9.6% Si, 1.32% Mg, balance aluminium and impurities has been used. In the plating bath the addition of Bi-ions has been omitted such that the applied Ni-layer is entirely consisting of nickel. Subsequently the same series of testing has been carried out given the same results as for Sample 3 in Example 1.

The presence of Mg in the aluminium clad layer had no detrimental effect on the brazeability of the brazing sheet product. In an amount of up to about 2.5% the Mg may even omit the addition of Bi to the aluminium clad layer and/or layer comprising nickel and still provide a good brazeability.

Example 3

Sample 4 of Example 1 has been used as a starting point for plating additional metal layers on the copper layer.

A sample 9 has been manufactured by plating a further zinc layer on the copper layer using a conventional zinc-sulphate plating bath.

And a sample 10 has been manufactured by plating a tin layer on the copper layer. The composition of the aqueous tin plating bath used was:

| | |
|---|---|
| tin 2+ ions | 26.1 g/l |
| Fe total | 15.5 g/l |
| sulphate | 5.2 g/l |
| Phenol Sulfonic Acid | 210 g/l |

The composition of the metal filler and the melting range of the metal filler have been determined in the same manner as in Example 1, and the results have been summarised in Table 4. The composition is given is weight percent, the balance is aluminium and impurities. The impurities originate mainly from the aluminium clad layer comprising for example Fe as impurity, see also Table 1.

The plated specimens of Sample 9 and 10 had similar adhesion and brazeability results as Sample 4 of Example 1. The plated zinc and tin layer in sample 9 and 10 respectively, do not act as a bonding layer for the aluminium clad layer and the nickel layer.

From the results of Table 4 it can be seen that the use of further applied metal layers may further reduce the melting range, and thus also the liquidus temperature, of the resultant filler metal while maintaining good CAB brazeability characteristics.

TABLE 4

| Sample | Composition of the metal filler [wt. %] | | | | | | | Melting range [° C.] |
|---|---|---|---|---|---|---|---|---|
| | Zn | Ni | Pb | Bi | Cu | Si | Sn | |
| 9 | 6.3 | 2.3 | — | 0.1 | 18.5 | 7.2 | — | 520–538 |
| 10 | 0.1 | 2.4 | — | 0.1 | 19.4 | 7.5 | 1.9 | 523–540 |

Having now fully described the invention, it will be apparent to one of ordinary skill in the art that many changes and modifications can be made without departing from the spirit or scope of the invention as herein described.

What is claimed is:

1. An aluminium brazing product comprising:
   a base substrate (1) of an aluminium alloy comprising silicon in an amount in the range of 2 to 18% by weight,
   a layer (2) comprising nickel on at least one outer surface of the base substrate (1), and
   a separately deposited layer (3) on one side of said layer (2) comprising nickel, said separately deposited layer (3) comprising a metal such that taken together said aluminium base substrate (1) and all layers of said aluminium brazing product exterior to said aluminium base substrate (1) form a metal filler having a liquidus temperature in the range of 490 to 570° C.

2. An aluminium brazing product according to claim 1, wherein the aluminium base substrate (1) is selected from a member of the group consisting of an aluminium alloy sheet, an aluminium alloy wire, and an aluminium alloy rod.

3. An aluminium brazing product according to claim 1, wherein the aluminium base substrate is made of an AA4000-series aluminium alloy.

4. An aluminium brazing product according to claim 1, wherein said separately deposited layer (3) is between said substrate (1) and said layer (2) comprising nickel.

5. An aluminium brazing product according to claim 1, wherein said separately deposited layer (3) comprises copper or copper-based alloy.

6. An aluminium brazing product according to claim 5, wherein said separately deposited layer (3) comprises at least 60% by weight copper.

7. An aluminium brazing product according to claim 1, wherein said separately deposited layer (3) has a thickness of not more than 10 micron.

8. An aluminium brazing product according to claim 1, wherein said aluminium base substrate (1) further comprises magnesium in a range of at most 8%.

9. An aluminium brazing product according to claim 1, wherein said layer (2) comprising nickel further comprises bismuth in a range of at most 5% by weight.

10. An aluminium brazing product according to claim 1, wherein said layer (2) comprising nickel is essentially lead-free.

11. An aluminium brazing product according to claim 1, wherein said layer (2) comprising nickel has a thickness of not more than 2 micron.

12. An aluminium brazing product according to claim 1, wherein said layer (2) comprising nickel is applied by means of electroplating.

13. An aluminium brazing product according to claim 1, further comprising a layer (5) comprising zinc or tin as a bonding layer between said outer surface of said aluminium base substrate (1) and said layer comprising nickel (2).

14. An aluminium brazing product according to claim 13, wherein said bonding layer (5) has a thickness of not more than 1 micron.

15. An aluminium brazing product according to claim 1, wherein taken together said aluminium base substrate and all layers exterior thereto, have a composition comprising at least, by weight percent:
   Si in the range of 5 to 10%,
   Cu in the range of 12 to 25%,
   Bi in the range of at most 0.25%,
   Ni in the range of 0.05 to 4%,
   Zn in the range of at most 20%,
   Sn in the range of at most 5%,
   Mg in the range of at most 5%,
   balance aluminium and impurities.

16. An aluminium brazing product according to claim 1, wherein taken together said aluminium base substrate and all layers exterior thereto, have a composition comprising at least, by weight percent:
   Si in the range of 7 to 10%,
   Cu in the range of 12 to 25%,
   Bi in the range of at most 0.25%,
   Ni in the range of 0.05 to 4%,
   Zn in the range of at most 0.25%,
   balance aluminium and impurities.

17. An aluminium brazing product according to claim 1, wherein taken together said aluminium base substrate and all layers exterior thereto, have a composition comprising at least, by weight percent:

Si in the range of 7 to 10%,
Cu in the range of 12 to 18%,
Bi in the range of at most 0.25%,
Ni in the range of 0.05 to 3%,
Zn in the range of at most 0.15%,
balance aluminium and impurities.

18. An aluminium brazing product according to claim 1, wherein taken together said aluminium base substrate (1) and all layers exterior to said aluminium base substrate (1) form said metal filler and said metal filler liquidus temperature is in the range of 510 to 550° C.

19. An aluminium brazing product according to claim 1, wherein said aluminium base substrate (1) contacts said layer (2) comprising nickel.

20. An aluminium brazing product according to claim 1, wherein said layer (2) comprising nickel has a thickness of not more than 1.0 micron.

21. An aluminium brazing product according to claim 13, wherein said bonding layer (5) has a thickness of not more than 0.3 micron.

22. An aluminium brazing product according to claim 1, wherein the aluminium base substrate comprises, in weight percent:

| | |
|---|---|
| Si | 2 to 18 |
| Mg | at most 8 |
| Zn | at most 5.0 |
| Cu | at most 5.0 |
| Mn | at most 0.5 |
| In | at most 0.3 |
| Fe | at most 0.8 |
| Sr | at most 0.2 | optionally one or more elements selected from the group consisting of:

| | |
|---|---|
| Bi | 0.01 to 1.0 |
| Pb | 0.01 to 1.0 |
| Li | 0.01 to 1.0 |
| Sb | 0.01 to 1.0 | impurities each of at most 0.05, total at most 0.20
balance aluminium.

23. An aluminium brazing product according to claim 1, wherein the aluminium base substrate comprises, in weight percent:

| | |
|---|---|
| Si | 5 to 14 |
| Mg | at most 5 |
| Zn | at most 5.0 |
| Cu | at most 5.0 |
| Mn | at most 0.5 |
| In | at most 0.3 |
| Fe | at most 0.8 |
| Sr | at most 0.2 | optionally one or more elements selected from the group consisting of:

| | |
|---|---|
| Bi | 0.01 to 1.0 |
| Pb | 0.01 to 1.0 |
| Li | 0.01 to 1.0 |
| Sb | 0.01 to 1.0 | impurities each of at most 0.05, total at most 0.20
balance aluminium.

24. An aluminium brazing sheet comprising:
said aluminium brazing product according to claim 1 and a core sheet (4) made of an aluminium alloy, wherein on at least one surface of said core sheet (4) is coupled the aluminium brazing product, said aluminium base substrate (1) being an aluminium clad layer, and said aluminium substrate (1) being made of said aluminium alloy comprising silicon in the amount in the range of 2 to 18% by weight, said layer (2) comprising nickel being on an outer surface of said aluminium clad layer, said clad layer (1) being between said core sheet (4) and said layer (2) comprising nickel, said separately deposited layer (3) being on one side of said layer (2) comprising nickel, and said separately deposited layer (3) comprising said metal such that taken together said aluminium clad layer (1) and all layers of the aluminium brazing product exterior to the aluminium clad layer (1) form a metal filler having a liquidus temperature in the range of 490 to 570° C.

25. An aluminium brazing sheet according to claim 24, wherein said separately deposited layer (3) comprises copper or copper-based alloy.

26. An aluminium brazing sheet according to claim 24, wherein said separately deposited layer (3) comprises at least 60% by weight copper.

27. An aluminium brazing sheet according to claim 24, wherein said separately deposited layer (3) has a thickness of not more than 10 micron.

28. An aluminium brazing sheet according to claim 24, wherein said aluminium base substrate (1) further comprises magnesium in a range of at most 8%.

29. An aluminium brazing sheet according to claim 24, wherein said layer (2) comprising nickel further comprises bismuth in a range at most 5% by weight.

30. An aluminium brazing sheet according to claim 24, wherein said layer (2) comprising nickel is essentially lead-free.

31. An aluminium brazing sheet according to claim 24, wherein said layer (2) comprising nickel has a thickness of not more than 2 micron.

32. An aluminium brazing sheet according to claim 24, wherein said layer (2) comprising nickel is applied by means of electroplating.

33. An aluminium brazing sheet according to claim 24, further comprising a layer (5) comprising zinc or tin as a bonding layer between said outer surface of said aluminium base substrate (1) and said layer comprising nickel (2).

34. An aluminium brazing sheet according to claim 33, wherein said bonding layer (5) has a thickness of not more than 0.5 micron.

35. An aluminium brazing sheet according to claim 24, wherein taken together said aluminium base substrate and all layers exterior thereto, have a composition comprising at least, by weight percent:

Si in the range of 5 to 10%,
Cu in the range of 12 to 25%,
Bi in the range of at most 0.25%,
Ni in the range of 0.05 to 4%,
Zn in the range of at most 20%,
Sn in the range of at most 5%,
Mg in the range of at most 5%,
balance aluminium and impurities.

36. An aluminium brazing sheet according to claim 24, wherein taken together said aluminium base substrate and all layers exterior thereto, have a composition comprising at least, by weight percent:
Si in the range of 7 to 10%,
Cu in the range of 12 to 25%,
Bi in the range of at most 0.25%,
Ni in the range of 0.05 to 4%,
Zn in the range of at most 0.25%,
balance aluminium and impurities.

37. An aluminium brazing sheet according to claim 24, wherein taken together said aluminium base substrate and all layers exterior thereto, have a composition comprising at least, by weight percent:
Si in the range of 7 to 10%,
Cu in the range of 12 to 18%,
Bi in the range of at most 0.25%,
Ni in the range of 0.05 to 3%,
Zn in the range of at most 0.15%,
balance aluminium and impurities.

38. An aluminium brazing sheet according to claim 24, wherein taken together said aluminium base substrate (1) and all layers exterior to said aluminium base substrate (1) form said metal filler and said metal filler liquidus temperature is in the range of 510 to 550° C.

39. An aluminium brazing sheet according to claim 24, wherein said aluminium base substrate (1) contacts said layer (2) comprising nickel.

40. An aluminium brazing sheet according to claim 24, wherein said layer (2) comprising nickel has a thickness of not more than 1.0 micron.

41. An aluminium brazing product according to claim 33, wherein said bonding layer (5) has a thickness of not more than 0.3 micron.

42. An aluminium brazing sheet according to claim 24, wherein the aluminium clad layer of the brazing sheet product comprises, in weight percent:

| | |
|---|---|
| Si | 2 to 18 |
| Mg | of at most 8 |
| Zn | of at most 5.0 |
| Cu | of at most 5.0 |
| Mn | of at most 0.5 |
| In | of at most 0.3 |
| Fe | of at most 0.8 |
| Sr | of at most 0.2 | optionally one or more elements selected from the group consisting of:

| | |
|---|---|
| Bi | 0.01 to 1.0 |
| Pb | 0.01 to 1.0 |
| Li | 0.01 to 1.0 |
| Sb | 0.01 to 1.0 | impurities each of at most 0.05, total of at most 0.20 balance aluminium.

43. An aluminium brazing sheet according to claim 24, wherein the aluminium clad layer of the brazing sheet product comprises, in weight percent:

| | |
|---|---|
| Si | 5 to 14 |
| Mg | of at most 5 |
| Zn | of at most 5.0 |
| Cu | of at most 5.0 |
| Mn | of at most 0.5 |
| In | of at most 0.3 |
| Fe | of at most 0.8 |
| Sr | of at most 0.2 | optionally one or more elements selected from the group consisting of:

| | |
|---|---|
| Bi | 0.01 to 1.0 |
| Pb | 0.01 to 1.0 |
| Li | 0.01 to 1.0 |
| Sb | 0.01 to 1.0 | impurities each of at most 0.05, total of at most 0.20 balance aluminium.

44. A method of manufacturing the aluminium brazing product according to claim 1, comprising depositing said layer (2) comprising nickel by electroplating both nickel and bismuth using an aqueous bath comprising a nickel-ion concentration in a range of 10 to 100 g/l and a bismuth-ion concentration in the range of 0.01 to 10 g/l.

45. A method according to claim 44, wherein said layer (2) comprising nickel is deposited by plating both nickel and bismuth using an aqueous bath having a pH in the range of 2.5 to 10, and comprising:
a nickel-ion concentration in a range of 10 to 100 g/l,
a bismuth-ion concentration in the range of 0.01 to 10 g/l,
a citrate-ion concentration in the range of 40 to 150 g/l,
a gluconate-ion concentration in the range of 2 to 80 g/l, and
a chloride- or fluoride-ion concentration in the range of 1 to 50 g/l.

46. Method according to claim 44, wherein said separately deposited layer (3) is applied by means of electroplating.

47. Method according to claim 46, wherein said separately deposited layer (3) comprising copper or copper-based alloy is deposited by electroplating using an alkaline cyanide plating bath.

48. A method of manufacturing the brazing product according to claim 13, comprising applying said bonding layer (5) comprising zinc or tin by a zincate treatment or a stannate treatment.

49. A method according to claim 48, wherein said separately deposited layer (3) is applied by means of electroplating.

50. A method according to claim 49, wherein said separately deposited layer (3) comprising copper or copper-based alloy is deposited by electroplating using an alkaline cyanide plating bath.

51. A method of manufacturing the aluminium brazing sheet according to claim 24, comprising depositing said layer (2) comprising nickel by electroplating both nickel and bismuth using an aqueous bath comprising a nickel-ion concentration in a range of 10 to 100 g/l and a bismuth-ion concentration in the range of 0.01 to 10 g/l.

52. A method according to claim 51, wherein said layer (2) comprising nickel is deposited by plating both nickel and bismuth using an aqueous bath having a pH in the range of 2.5 to 10, and comprising:

a nickel-ion concentration in a range of 10 to 100 g/l, a bismuth-ion concentration in the range of 0.01 to 10 g/l, a citrate-ion concentration in the range of 40 to 150 g/l, a gluconate-ion concentration in the range of 2 to 80 g/l, and a chloride- or fluoride-ion concentration in the range of 1 to 50 g/l.

53. Method according to claim 52, wherein said separately deposited layer (3) is applied by means of electroplating.

54. Method according to claim 53, wherein said separately deposited layer (3) comprising copper or copper-based alloy is deposited by electroplating using an alkaline cyanide plating bath.

55. A method of manufacturing the brazing sheet according to claim 33, comprising applying said bonding layer (5) comprising zinc or tin by a zincate treatment or a stannate treatment.

56. A method according to claim 55, wherein said separately deposited layer (3) is applied by means of electroplating.

57. A method according to claim 56, wherein said separately deposited layer (3) comprising copper or copper-based alloy is deposited by electroplating using an alkaline cyanide plating bath.

58. A method of manufacturing an assembly of brazed components, comprising the steps of:

(a) shaping parts of which at least one is made from said brazing sheet according to claim 24;

(b) assembling the parts into the assembly;

(c) brazing the assembly under a vacuum or in an inert atmosphere in the absence of a brazing-flux at elevated temperature for a period long enough for melting and spreading of the molten filler;

(d) cooling the brazed assembly.

59. A method of manufacturing the assembly of brazed components of claim 58, wherein in step (a) at least one of the parts to be brazed is made of said brazing sheet, and at least one other part is selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

60. A method of manufacturing an assembly of brazed components, comprising the steps of:

(a) shaping parts of which at least one is made from brazing sheet obtained by the method according to claim 51;

(b) assembling the parts into the assembly;

(c) brazing the assembly under a vacuum or in an inert atmosphere in the absence of a brazing-flux at elevated temperature for a period long enough for melting and spreading of the molten filler;

(d) cooling the brazed assembly.

61. A method of manufacturing the assembly of brazed components of claim 60, wherein in step (a) at least one of the parts to be joined by brazing is made of said brazing sheet, and at least one other part is selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

62. A method of manufacturing an assembly of brazed components, comprising the steps of:

(a) shaping parts of which at least one is made from brazing sheet obtained by the method according to claim 55;

(b) assembling the parts into the assembly;

(c) brazing the assembly under a vacuum or in an inert atmosphere in the absence of a brazing-flux at elevated temperature for a period long enough for melting and spreading of the molten filler;

(d) cooling the brazed assembly.

63. A method of manufacturing the brazed assembly of claim 62, wherein in step (a) at least one of the parts to be brazed is made of said brazing sheet, and at least one other part is selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

64. A brazed assembly manufactured in accordance with claim 58.

65. A brazed assembly of claim 64, wherein said brazed assembly is a heat-exchanger.

66. A brazed assembly of claim 64, wherein said brazed assembly is an electrochemical fuel cell.

67. A brazed assembly manufactured in accordance with claim 60.

68. A brazed assembly manufactured in accordance with claim 62.

69. A brazed assembly comprising a brazing sheet of claim 24 brazed to a metal part.

70. A method of joining two structural elements comprising contacting the two structural elements, welding together the two structural elements in a welding operation to form a weld joint, and melting aluminium brazing product according to claim 1 in the form of an aluminium alloy wire or an aluminium alloy rod as filler metal at the weld joint during the welding operation.

* * * * *